Patented May 4, 1954

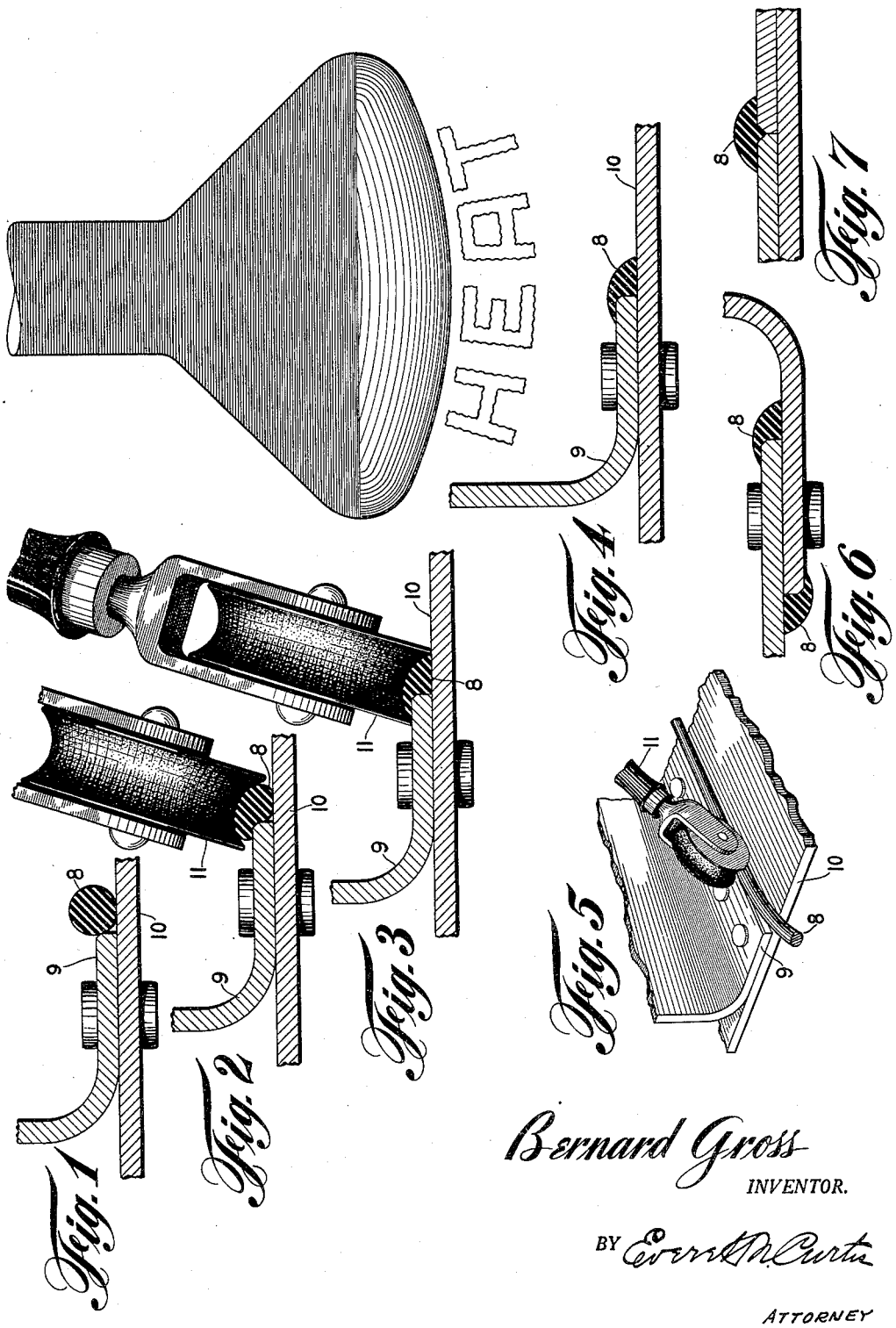

2,677,633

UNITED STATES PATENT OFFICE 2,677,633

PROCESSES FOR SEALING THE SEAMS AND JOINTS OF STRUCTURES FABRICATED OF NONPOROUS MATERIALS

Bernard Gross, San Diego, Calif., assignor to Rohr Aircraft Corporation, Chula Vista, Calif., a corporation of California Application August 7, 1950, Serial No. 178,122

3 Claims. (Cl. 154—116)

My invention relates to a method and means for producing a hermetic seal at the joints and seams of structures fabricated of nonporous materials, such as metal, plastics, etc. It is especially useful in the sealing of fluid containers, particularly gasoline tanks of aircraft, but may also be used for sealing other structures where fluid tightness is required.

It is an object of this invention to provide an improved method for sealing the seams and joints of structures fabricated of rigid, nonporous materials, such as metal, plastics, glass, ceramics, etc.

Another object is to provide an improved means for producing a hermetic seal.

Still another object is to provide a means for sealing which offers a reduction in weight as compared to other means now in common use.

A further object is to provide a means for sealing which is flexible and resilient.

A still further object is to provide a method and means for effectively sealing seams and joints in the shortest possible time and with the minimum amount of waste.

It is also an object of this invention to provide a sealing means which offers a uniform bonding area to the joint being sealed.

Other objects are apparent in the description of my invention as hereinafter set forth.

It has long been recognized that the seams and joints of aircraft structures must in many cases be hermetically sealed against leakage of fuels, lubricants, and other fluids. Since aircraft structures are subject to various stresses and strains, it is necessary that such sealing means have a certain degree of flexibility and resilience. Such a means for sealing must also have good adhesive or bonding characteristics if an effective seal is to be maintained.

I am aware that the use of rubber materials for fluid tight sealing applications is old, there being many methods now in common use which employ such materials. Among these methods are: gasket type sealing, interior surface coating (in the case of tanks), and the application of paste compounds.

In the application of gasket type sealing to sheet metal structures a uniform seal is not always assured, there being a concentration of pressure at the fasteners, around rivets for example, and a lesser amount of pressure between the fasteners, such unequal distribution of pressure many times resulting in an impaired seal and subsequent leakage.

Interior surface coating of tanks and vessels by spraying or painting synthetic rubber compounds has certain disadvantages, such as the possible formation of air bubbles in or under the sealing material, uncertain application of the material at critical points, and the unnecessary increase in weight resulting from application to the entire inner surface.

Paste compounds are difficult to apply, do not give a uniform seal, and there is no assurance of the complete elimination of air from under the sealant, such elimination being necessary in order to ensure a permanent, uniform bond.

Essentially, my invention consists in the preparation and application of preformed storable lengths of uncured rubber material, for sealing purposes. The material is furnished in short predetermined lengths or in continuous lengths and stored in packages or on reels prior to use. The cross sectional shape of the preformed material may vary in accordance with the nature of the joint to be sealed. For general application, however, a circular cross section is particularly adaptable. The material may be preformed from any thermosetting type of rubber compound which in its final cured state will possess the fluid resistance characteristics necessary to fulfill the requirements of the sealing job concerned. For example, in cases where the seal is intended to hold or resist gasoline, polysulphide type of rubber, catalyzed with an oxidizer such as zinc oxide may be used. Preferably, the required curing temperature of the compound is within the range of 140 to 200 degrees Fahrenheit, the type and quantity of catalyzer being controlled to ensure a complete cure and bond within one to four hours.

The sealing operation is accomplished by first placing a preformed length of rubber material (while still in its uncured, nonresilient state) against the seam or joint to be sealed. The material is then formed into a fillet, by means of a forming device, preferably of a roller type. The plasticity of the rubber, in its uncured condition, permits it to flow into bonding contact with the surface of the joint, when pressure is applied by the roller. The fillet forming operation having been completed, the material is then cured by heat into its final resilient state, permanently bonding it to the structure, without necessity of additional adhesives. The heat may be generated by any suitable well known means, and the temperature controlled to meet the curing requirements of the particular compound used.

Attention is invited to the accompanying drawing illustrating a preferred form of my invention, in which:

The first four figures illustrate the successive steps in applying my invention to a simple structural lap joint.

Figure 1 is a sectional view of a structural joint showing the preformed material in place and ready to be formed into a fillet.

Figure 2 is a sectional view of the same joint showing a roller being applied to form the fillet.

Figure 3 is a sectional view of the same joint showing the initial adherence of the formed fillet, prior to curing.

Figure 4 is a sectional view of the same joint showing the application of heat during the curing and bonding operation.

Figure 5 is a perspective view of the joint showing a length of the uncured sealing material being formed into a fillet.

Figures 6 and 7 are sectional view, illustrating the application of my invention to a double lap joint and a butt joint respectively.

Referring to the drawing, Figure 1 shows a preformed length of uncured sealing material 8, placed against the vertical edge surface of member 9 and the horizontal surface of member 10, which two members form the joint to be sealed. The preformed sealing material, in its uncured nonresilient state, may be easily formed into a fillet along curved, irregular, or straight surfaces. The joint should be thoroughly cleaned (preferably with a volatile solvent) prior to placement of the sealing material, in order that a positive initial adherance may be ensured when the fillet is formed.

Figures 2 and 5 illustrate how a roller 11 is applied to the uncured sealing material 8. Pressure is applied by moving the roller 11 along the length of the sealing material 8, thus forming the said material into a fillet. It may be seen that when the material 8 flows into the crevice of the joint, a certain "wiping action" occurs ahead of the roller 11, forcing the air from between the sealing material and the surfaces of members 9 and 10, thus permitting a tight, uniform initial adherance. It is preferable that the preformed material 8 be fed into position just ahead of the roller as shown in Figure 5.

In Figure 3, it may be seen that the cross sectional shape of the sealing material 8 has been completely changed by pressure of the roller 11, forming a smooth and uniform fillet, ready to be cured.

In Figure 4, the completed fillet of uncured rubber sealing material 8, is shown being cured by heat, and thus transformed into a resilient seal, permanently bonded to the surfaces of members 9 and 10.

My invention may be embodied in other specific forms without departing from the spirit or essential characteristics thereof. The present embodiment, as above set forth, is therefore to be considered in all respects as illustrative and not restrictive, the scope of my invention being indicated by the appended claims rather than by the foregoing description, and all changes which come within the meaning and range of equivalency of the claims are therefore intended to be embraced therein.

Where in the specification and appended claims, I use the term "preformed length," I desire to be understood as meaning a self sustaining body of material, made up into a given cross section, to any desired length, and capable of being stored (at normal room temperatures) prior to use.

Where I use the term "thermosetting," I desire to be understood as meaning the presence of properties in the rubber compound which cause polymerization of that compound at elevated temperatures, thus transforming it from plastic nonresilient condition into a resilient condition.

What I claim and desire to protect by Letters Patent is:

1. The method of sealing the joint between two abutting nonporous metallic members which are securely connected together, comprising the steps of placing a preformed nonresilient strip of uncured thermosetting rubber material along the joint; forcing, at the temperature of the ambient atmosphere, adjacent portions of the strip in succession into the void between the strip and the adjacent surfaces of the members to displace the air between said surfaces and adjacent portions of the strip as said portions are successively pressed against the members to form a continuous smooth fillet covering the joint and projecting out from the members; and subsequently heating the attached fillet at atmospheric pressure to convert it to a resilient state and firmly bond the fillet to the members.

2. The method of sealing the joint between two nonporous rigid members connected together by a lap joint, comprising the steps of placing a preformed nonresilient strip of uncured thermosetting rubber material along the end of one member; forcing, at the temperature of the ambient atmosphere adjacent portions of the strip in succession into the void between the strip and said end to displace the air between said end and adjacent portions of the strip as said portions are successively pressed against said end to form a continuous fillet covering said end and sealing the joint; and subsequently heating the attached fillet at atmospheric pressure to convert it to a resilient state and firmly bond the fillet to the members.

3. The method of sealing the joint between two nonporous rigid members connected together by a lap joint, comprising the steps of placing a preformed nonresilient strip of uncured rubber material along the end of the first member; pressing, at the temperature of the ambient atmosphere, adjacent portions of the strip in succession against said end and the contiguous surfaces of both members to provide a continuous fillet covering said end and also portions of both members; and subsequently heating the attached fillet at atmospheric pressure to convert it to a resilient state and securely bond the fillet to the members.

References Cited in the file of this patent

UNITED STATES PATENTS

| Number | Name | Date |
|---|---|---|
| 1,899,067 | Trumbull | Feb. 28, 1933 |
| 2,041,357 | Kraft | May 19, 1936 |
| 2,186,793 | Wodtke | Jan. 9, 1940 |
| 2,304,718 | Swart | Dec. 8, 1942 |
| 2,409,571 | Leguillon | Oct. 15, 1946 |